United States Patent
Paratore et al.

(10) Patent No.: US 7,081,221 B2
(45) Date of Patent: Jul. 25, 2006

(54) INJECTION-MOLDED FOOTWEAR HAVING A TEXTILE-LAYERED OUTER SOLE

(76) Inventors: Stephen L. Paratore, 63 Moraine St., Apt. 19, Belmont, MA (US) 02478; Bilo Tsui, Block 13 Flat E 11 Floor, Sea Creat Villa., Phase 4, Tsing Lung Tau N.T. Hong Kong (CN)

( * ) Notice: Subject to any disclaimer, the term of this patent is extended or adjusted under 35 U.S.C. 154(b) by 288 days.

(21) Appl. No.: 10/413,246

(22) Filed: Apr. 14, 2003

(65) Prior Publication Data

US 2003/0227105 A1    Dec. 11, 2003

Related U.S. Application Data

(60) Provisional application No. 60/372,463, filed on Apr. 12, 2002, provisional application No. 60/372,464, filed on Apr. 12, 2002.

(51) Int. Cl.
    *B29D 31/51*      (2006.01)
(52) U.S. Cl. ................. 264/161; 264/229; 264/244; 264/257; 425/111; 425/119; 425/123; 425/129.2
(58) Field of Classification Search .............. 425/119, 425/123, 129.2, 111; 264/244, 161, 229, 264/257; B29D 31/51, 31/508
See application file for complete search history.

(56) References Cited

U.S. PATENT DOCUMENTS

| | | |
|---|---|---|
| 384,483 A | 6/1888 | Walters |
| 1,399,766 A | 12/1921 | Grosjean |
| 1,587,377 A | 6/1926 | Grosjean |
| 1,716,790 A | 6/1929 | Mitchell |
| 2,121,678 A | 6/1938 | Armor |
| 2,371,689 A | 3/1945 | Gregg et al. |
| 2,391,564 A | 12/1945 | Gregg |
| 2,400,487 A | 5/1946 | Clark |
| 2,499,751 A | 3/1950 | Hoza |
| 2,603,891 A | 7/1952 | Cohn |
| 3,014,244 A * | 12/1961 | Hansjosten ............... 425/119 |
| 3,016,631 A | 1/1962 | Servin |
| 3,063,074 A | 11/1962 | Scholl |
| 3,175,249 A * | 3/1965 | Ferreira ................... 425/119 |

(Continued)

FOREIGN PATENT DOCUMENTS

DE     40 15 138 A1    11/1991

(Continued)

*Primary Examiner*—Robert B. Davis

(57) ABSTRACT

An article of textile-soled footwear and method of making employ a simple fabrication process and apparatus that allows fabrication of the footwear outer shell via a single injection-molding step. The article of footwear has a textile layer at the ground-contacting surface of the outsole, the textile layer being moldably and integrally attached, in a common mold, to the molded outsole as it is being created during the injection process. Fasteners are set along the side of the sole plate of the injection mold to secure the textile layer across the sole plate and prevent it from being moved during injection of the moldable compound to form the outsole. The sole plate and the sidewalls of the injection mold are assembled in place for the injection process. The shoe upper is fitted onto the shoe last and set in place in the mold, the mold is closed, and the moldable compound is injected into the mold. Once injection is complete, the mold side walls are opened, the injected shoe is removed, and the excess textile layer is trimmed. In the preferred embodiment, the molded outsole layer is made of a thermoplastic resin and the ground-contacting textile layer is a combination of cotton, polyester, and Lycra®.

6 Claims, 11 Drawing Sheets

U.S. PATENT DOCUMENTS

| | | | |
|---|---|---|---|
| 3,246,068 A * | 4/1966 | Ferreira | 264/244 |
| 3,352,032 A | 11/1967 | Yamaguchi | |
| 3,439,384 A * | 4/1969 | Crossen et al. | 425/119 |
| 3,522,340 A * | 7/1970 | Corcoran et al. | 264/244 |
| 3,672,077 A | 6/1972 | Coles | |
| 3,758,903 A | 9/1973 | Auberry et al. | |
| 3,863,272 A | 2/1975 | Guille | |
| 3,888,026 A | 6/1975 | Dassler | |
| 3,965,517 A | 6/1976 | Auberry et al. | |
| 3,983,204 A | 9/1976 | Opinsky et al. | |
| 4,122,574 A | 10/1978 | Karalis | |
| 4,134,955 A | 1/1979 | Hanreira, Jr. et al. | |
| 4,149,696 A * | 4/1979 | Koch et al. | 425/119 |
| 4,356,643 A | 11/1982 | Kester et al. | |
| 4,372,525 A | 2/1983 | Uhlig | |
| 4,519,148 A | 5/1985 | Sisco | |
| 4,581,187 A | 4/1986 | Sullivan et al. | |
| 4,651,444 A | 3/1987 | Ours | |
| 5,123,180 A | 6/1992 | Nanning et al. | |
| 5,150,536 A | 9/1992 | Strong | |
| 5,553,399 A | 9/1996 | Strong | |
| 5,647,150 A | 7/1997 | Romanato et al. | |
| 5,955,017 A * | 9/1999 | Foffano et al. | 425/119 |
| 6,035,554 A | 3/2000 | Duncan | |
| 6,312,782 B1 | 11/2001 | Goldberg et al. | |
| 6,321,464 B1 | 11/2001 | Oberg et al. | |
| 6,430,844 B1 | 8/2002 | Otis | |
| 6,571,491 B1 | 6/2003 | Safdeye et al. | |
| 6,696,000 B1 | 2/2004 | Otis et al. | |
| 6,698,109 B1 | 3/2004 | Otis et al. | |
| 6,782,642 B1 * | 8/2004 | Knoche et al. | 36/129 |
| 2002/0148141 A1 | 10/2002 | Otis et al. | |
| 2002/0152638 A1 | 10/2002 | Safdeye et al. | |
| 2002/0152639 A1 | 10/2002 | Otis et al. | |
| 2002/0166261 A1 | 11/2002 | Safdeye et al. | |
| 2003/0009919 A1 | 1/2003 | Stein | |
| 2004/0006890 A1 | 1/2004 | Otis et al. | |

FOREIGN PATENT DOCUMENTS

FR     2 617 382     1/1989

\* cited by examiner

INJECTION-MOLDED FOOTWEAR HAVING A TEXTILE-LAYERED OUTER SOLE

RELATED APPLICATIONS

This application claims priority to U.S. Provisional Application Ser. No. 60/372,463 and U.S. Provisional Application Ser. No. 60/372,464, both filed Apr. 12, 2002.

FIELD OF THE INVENTION

This invention relates to footwear fabrication and, in particular, to injection mold fabrication of footwear having a textile-layered outer sole.

BACKGROUND

Footwear components can be joined by any number of well-known methods, including, but not limited to, stitching by hand or machine, adhesives, vulcanization, and injection molding. The method of joining can affect many aspects of the footwear, including durability and cost of manufacture.

While joining footwear components by stitching is capable, depending on the type of components to be joined, of producing a durable product, it can be a time consuming and costly method of footwear fabrication, requiring many separate steps. The manufacture of footwear with components joined by adhesives can be much more economical, but the resulting product is frequently not particularly durable, with components often separating over time due to factors such as repeated flexing, abrasion, or exposure to moisture. Footwear with vulcanized or moldably attached components and layers is more durable, in that the layers and/or components are more firmly joined and much less likely to separate over long use. It is also generally more economical and quicker to manufacture than footwear assembled by stitching. Further, components or layers that are actually made from moldable materials tend to be particularly resilient, durable, and flexible.

In vulcanization, layers of thermoplastic, rubber, or other moldable substances are put in place while cold. The assembled pieces are then subjected to heat and pressure sufficient to fuse the moldable layers to each other and/or to the other layers present. Drawbacks of vulcanization include the complexity of assembling multiple solid layers for processing and holding them in place, the difficulty of selecting materials able to withstand the heat and pressure required during the process, and the relative stiffness of the final product.

Injection molding uses a screw to force thermoplastic or other moldable material through a heated tube into a mold. The injected material fills all unoccupied space between the mold and any inserted moldable or nonmoldable components being attached during the molding process. Textile components utilized become impregnated with the moldable material and are thereby firmly anchored into the molded component when it cools.

There are several areas in an article of footwear that are stress points at which failure of the footwear is likely to occur. The join between the shoe upper and outsole is such a stress point, being particularly prone to separation and/or tearing. The outsoles themselves must also be able to withstand a lot of wear and tear, from both ground contact and flexing during use. For this reason, ground-contacting textile outsole layers that are not firmly attached over their entire upper surface to an overlying supporting layer are particularly prone to tearing and separation from the shoe.

The construction of footwear outsoles also determines many important characteristics of the footwear, such as durability, flexibility, comfort, stability, foot support, and slip resistance. For example, the shape and composition of the outsole particularly affect slip resistance. Footwear articles with textile soles, especially those that do not have a supporting layer, are generally not slip resistant because they tend to have a smooth surface with no way to provide treads to improve traction. They also are not very durable, particularly if subjected to outdoor walking conditions. Further, the lack of support they provide can be uncomfortable on uneven surfaces such as gravel or decking, as well as for persons needing more arch or foot support. Provision of a midsole board between the textile outsole and an inner sole to improve comfort on uneven surfaces is sometimes attempted, but it complicates fabrication of the footwear, may render it less durable, and frequently reduces comfort on normal surfaces. Provision of a molded-type outsole to which a ground-contacting textile layer is adhesively attached is more successful, but the resulting outsole is prone to the layer separation problem discussed earlier.

Until now, the attachment of the upper and the ground-contacting textile layer have had to be performed in separate steps. In some circumstances, this is due to the nature of the selected attachment mechanism, such as stitching, adhesion with glue-type substances, or vulcanization. Even using injection molding, the provision of a process whereby a textile layer could be moldably attached to the ground-contacting side of an outsole at the same time as the upper has been difficult because of the difficulties of keeping the textile layer firmly in place while molding the outsole. With existing processes, the textile layer is prone to blowing off, tearing, wrinkling, or causing creases in the molded product. Being able to perform these parts of the footwear fabrication process simultaneously would be beneficial, resulting in cheaper production costs due to, among other things, the need for less labor, less energy consumption, less total time for fabrication, and less waste of raw materials.

What has been needed, therefore, is an article of textile-soled footwear wherein all outer components, including the upper and ground-contacting textile layer, are moldably attached in a single injection-molding process to a molded outsole. What has particularly been needed is a method and apparatus by which the upper and ground-contacting textile layer can be attached during the same injection-molding step in which the molded outsole is created.

OBJECTS OF THE INVENTION

Accordingly, an object of the present invention is to provide an article of footwear having a textile layer at the ground-contacting surface of the outsole.

A further object of the present invention is to provide a simple process and apparatus for the fabrication of textile-soled footwear.

A particular object of the present invention is to provide a process and apparatus for the fabrication of the outer shell of an article of textile-soled footwear via a single injection-molding step.

Another particular object of the present invention is to provide an article of textile-soled footwear that is more durable than footwear having non-moldably attached uppers.

A particular object of the invention is to provide a textile-soled article of footwear that is durable when worn on outside-type surfaces.

A further particular object of the present invention is to provide a textile-soled article of footwear that is durable despite repeated flexing.

Another particular object of the invention is to provide a textile-soled article of footwear that is slip-resistant.

Yet another particular object of the invention is to provide a textile-soled article of footwear that has a flexible but shape-retaining outsole.

SUMMARY

These and other objectives are met by the present invention, which is a simple process and apparatus for the fabrication of textile-soled footwear that allows fabrication of the footwear outer shell via a single injection-molding step. The apparatus and method of the present invention provide an article of footwear having a textile layer at the ground-contacting surface of the outsole, the textile layer being moldably and integrally attached, in a common mold, to a molded outsole layer as it is being created during the injection process. This article of textile-soled footwear is more durable than footwear having non-moldably attached uppers, is durable even when worn on outside-type surfaces, is slip-resistant, has a flexible but shape-retaining outsole, and is durable despite repeated flexing.

In the process of the present invention, fasteners are set along the side of the sole plate of the injection mold to secure the textile layer and prevent it from being moved during injection of the moldable compound used to form the molded outsole layer. The textile layer is mounted to the fasteners on the side of the sole plate. The sole plate and the sidewalls of the injection mold are assembled in place for the injection process. The shoe upper is fitted onto the shoe last and set in place in the mold. The moldable compound is then injected into the mold. Once injection is complete, the mold side walls are opened, the injected shoe is removed, and the excess textile layer is trimmed.

In the preferred embodiment, the molded outsole layer is made of a thermoplastic resin; however, any material capable of use in injection molding and of bonding to the materials selected for the upper and textile outsole layer is suitable. The textile employed for the ground-contacting textile layer in the present invention can be any natural or man-made textile.

Textile fasteners are attached to the sole plate to keep the textile layer firmly in place on the sole plate during the injection molding process, preventing the textile from being blown off, torn, or wrinkled, or otherwise causing a crease during injection. The number and spacing of the textile fasteners is chosen based on the choice of textile and the footwear size being fabricated. In the preferred embodiment, there are at least eight textile fasteners.

Molding the upper directly to the sole provides a superior bond, making the resulting article of footwear more durable. It also creates a more flexible footwear article, as no midsole is required that might hinder flex. While in a preferred embodiment the upper is a textile made of natural or man-made fibers, any other type of upper known in the art, including, but not limited to, leather, rubber, and plastic, would be suitable for use in the present invention.

In one embodiment, the finished outsole layer extends around the side of the upper, allowing the finished outsole to be moldably attached to the upper across a wide band. This gives the finished outsole a foxing-like appearance and greatly increases the footwear durability because of the large area of attachment between the outsole and upper, making separation of the outsole and the upper unlikely.

In a preferred embodiment of the invention, the molded outsole layer has treads that provide improved slip resistance and to which the textile outsole layer is moldably conformed. With use, the ground-contacting textile outsole layer may wear away from the ground-contacting surfaces of the treads, which will generally increase slip resistance. An important feature of the present invention is that, because the ground-contacting textile outsole layer and the molded outsole layer are integrally molded together, this wearing away does not cause tears in the ground-contacting textile outsole layer or separation of the textile outsole layer from the molded outsole layer.

DETAILED DESCRIPTION

Figure 1:
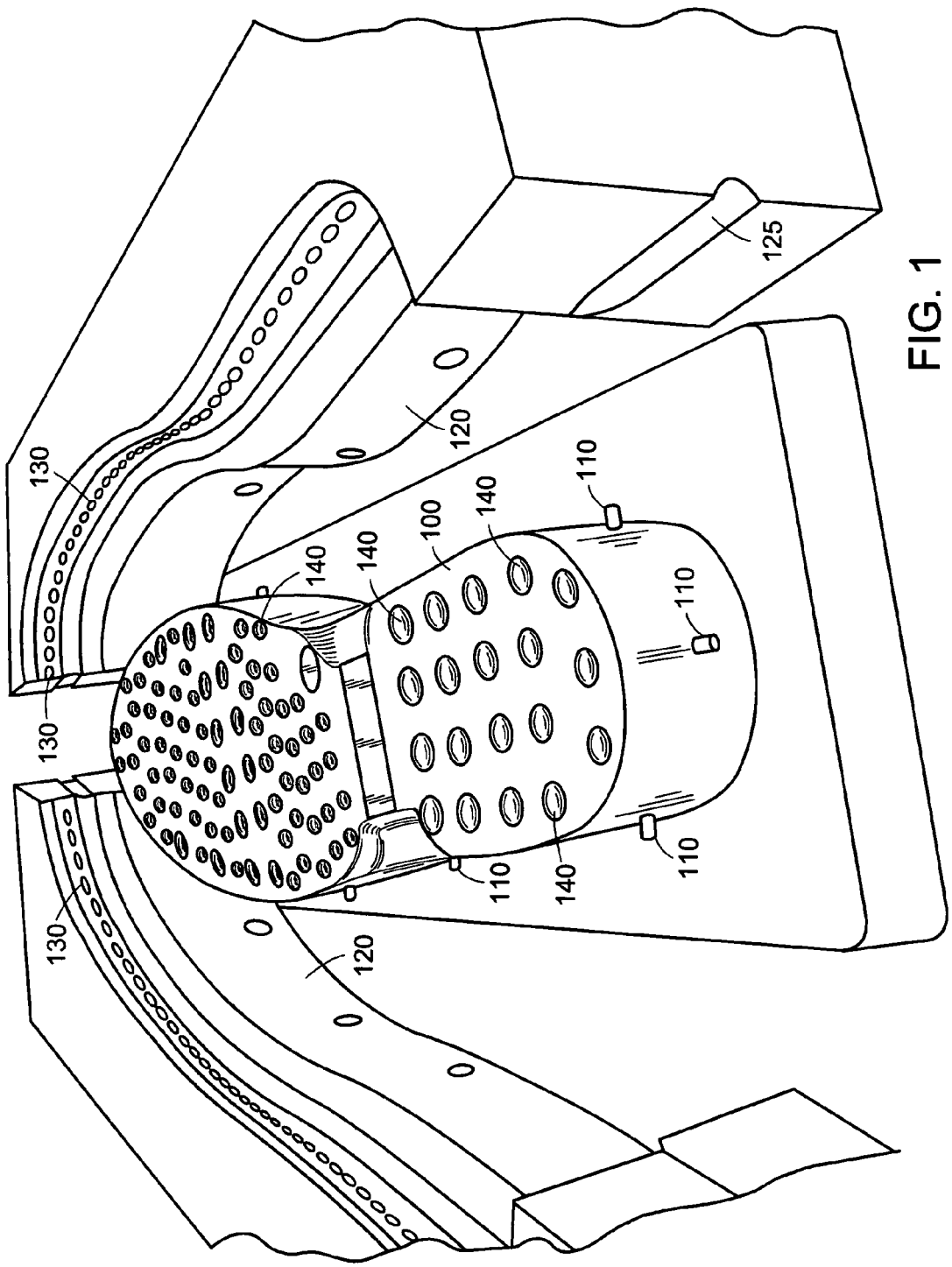
FIG. 1 depicts the sole plate, textile fasteners, and mold side walls utilized in an example embodiment of the process and apparatus of the present invention.

The present invention is a manufacturing process and apparatus for the production of textile-soled injection-molded footwear, such as, but not limited to, slippers, as well as articles of footwear made thereby. The invention provides for fabrication of the entire footwear outer shell in a single injection molding step, simultaneously moldably attaching both the upper and the ground-contacting textile layer to the molded outsole layer. The process is used to produce a textile-soled footwear article wherein the textile layer is moldably and integrally attached, in a common mold, to the molded outsole as the outsole is being created during the injection process.

As discussed above, a problem has been the provision of a process whereby a textile layer could be moldably attached to the ground-contacting side of an outsole at the same time as the upper. The present invention solves this problem. Being able to perform these two parts of the footwear fabrication process at the same time results in cheaper production costs due to, among other things, the need for less labor, less energy consumption, and less waste of raw materials. This provides a competitive advantage.

The basic steps of the process of the present invention include:

(a) Fasteners are set along the side of the sole plate of the injection mold to secure the textile layer and prevent it from being moved in relation to the sole plate during injection of the moldable compound during forming of the outsole.
(b) The textile layer is mounted to the fasteners on the side of the sole plate.
(c) The sole plate and the sidewalls of the injection mold are assembled in place for the injection process.
(d) The shoe upper is fitted onto the shoe last and set in place in the mold and the mold is closed.
(e) The moldable compound is injected into the mold.
(f) Once injection is complete, the mold side walls are opened, the injected shoe is removed, and the excess textile layer is trimmed.

In one embodiment of the present invention, the article of footwear has a unit-molded rubber or thermoplastic outsole covered with textile at the ground-contacting surface. In the preferred embodiment, the molded outsole layer is made of a thermoplastic resin, which is preferred because of the ability of thermoplastics to be hardened and melted more than once. However, any material capable of use in injection molding and capable of bonding to the materials chosen for the upper and the textile layer is suitable including, but not limited to, rubber, latex, or many elastomeric polymers.

The textile employed for the ground-contacting textile layer in the present invention can be any natural or man-made textile. However, certain textiles perform better than others do during the vigorous injection molding process, so the options should be carefully evaluated for texture, thickness, stretchability, heat resistance, and density. In a preferred embodiment of the invention, the textile utilized is a combination of cotton, polyester, and Lycra®, most frequently in the ratio 10% cotton, 70% polyester, and 20% Lycra®. This combination provides sufficient stretchability that the fabric can be pulled flat and held very tightly over the sole plate. The texture of the fabric also affects stretchability, in that different methods of weaving or knitting the fibers together will provide different fabrics made with the same percentages of various fibers with a different amount of stretch. In the preferred embodiment, the most desirable textile stretchability percentages have been empirically determined to be in the range 11–13%, with 12% being optimum, and the texture of the textile is chosen accordingly.

The thickness of the chosen textile is also important. Too thick a textile may not conform properly to the sole plate, causing failure of the molding process, or to the desired shape of the molded outsole, potentially lowering the slip resistance and durability of the finished product. Too thin a textile may not withstand the injection molding process. In the preferred embodiment of the invention, the optimum thickness has been determined to lie between 0.29 and 0.31 mm. The textile normally utilized has a thickness of 0.3 mm.

The textile chosen should also have heat resistance sufficient that the textile can maintain its integrity during the injection molding process. It has been determined empirically for the preferred embodiment that a heat resistance of 174.5 to 185.5 degrees Centigrade is optimum. In the preferred embodiment, the textile normally utilized has a heat resistance of 180 degrees Centigrade.

FIG. 1 depicts the sole plate 100, textile fasteners 110, and closeable mold side walls 120 utilized in an example embodiment of the process and apparatus of the present invention. The sole plate 100 may be any shape and size that will provide a suitable mold for the desired final outsole form. When side walls 120 are closed to form the complete mold, injection channel halves 125 located in each side wall 120 are joined to form an injection channel that will allow the moldable material to flow into the mold from the injection apparatus during injection.

The textile fasteners 110 can be any type of fastener known in the art that is suitable for holding the material to the sole plate, such as nails, pins, or clips. The fasteners 110 keep the textile layer firmly in place on the sole plate 100 during the injection molding process, preventing the textile from being blown off, torn, or wrinkled, or otherwise causing a crease during injection, problems which have hindered attempts to achieve one-step moldable construction of textile-soled footwear in the past.

The number of textile fasteners is chosen based on the choice of textile and the footwear size being fabricated. In the preferred embodiment, there are at least eight textile fasteners, determined empirically for that embodiment to be the minimum number required for optimum tightness of the textile layer over the sole plate. For most sizes of footwear, eight to ten fasteners are sufficient, although more may be used if desired. Spacing of the fasteners is also chosen based on the choice of textile and footwear size. It has been empirically determined that, in the preferred embodiment of the invention, the optimum spacing is between 4.4 and 4.6 mm, so that normally the fasteners in the preferred embodiment are spaced 4.5 mm apart.

In the embodiment pictured, small optional depressions 130 are also present along the mold side walls 120 to create an optional decorative seam detail along the side of the finished outsole. Similarly, optional depressions 140 are present in sole plate 100 for the formation of treads on the finished outsole bottom. Any type of pattern, design, label, or similar device may be formed on any desired surface of the outsole by creation of appropriate molding sites in sole plate 100 or mold side walls 120.

Figure 2:
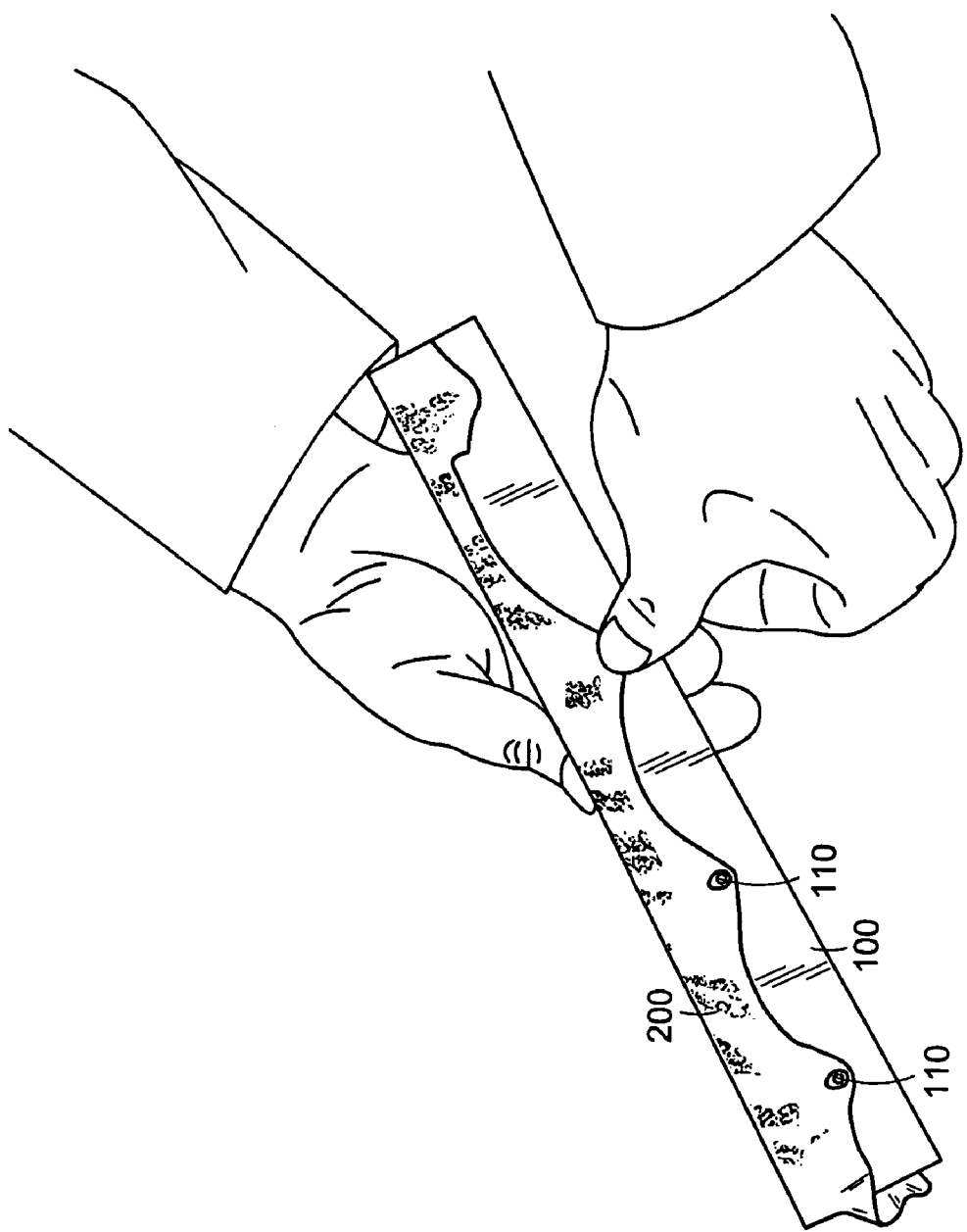
FIG. 2 depicts the textile layer being attached to the textile fasteners on the sole plate of an example embodiment of the process and apparatus of the present invention.
Figure 3:
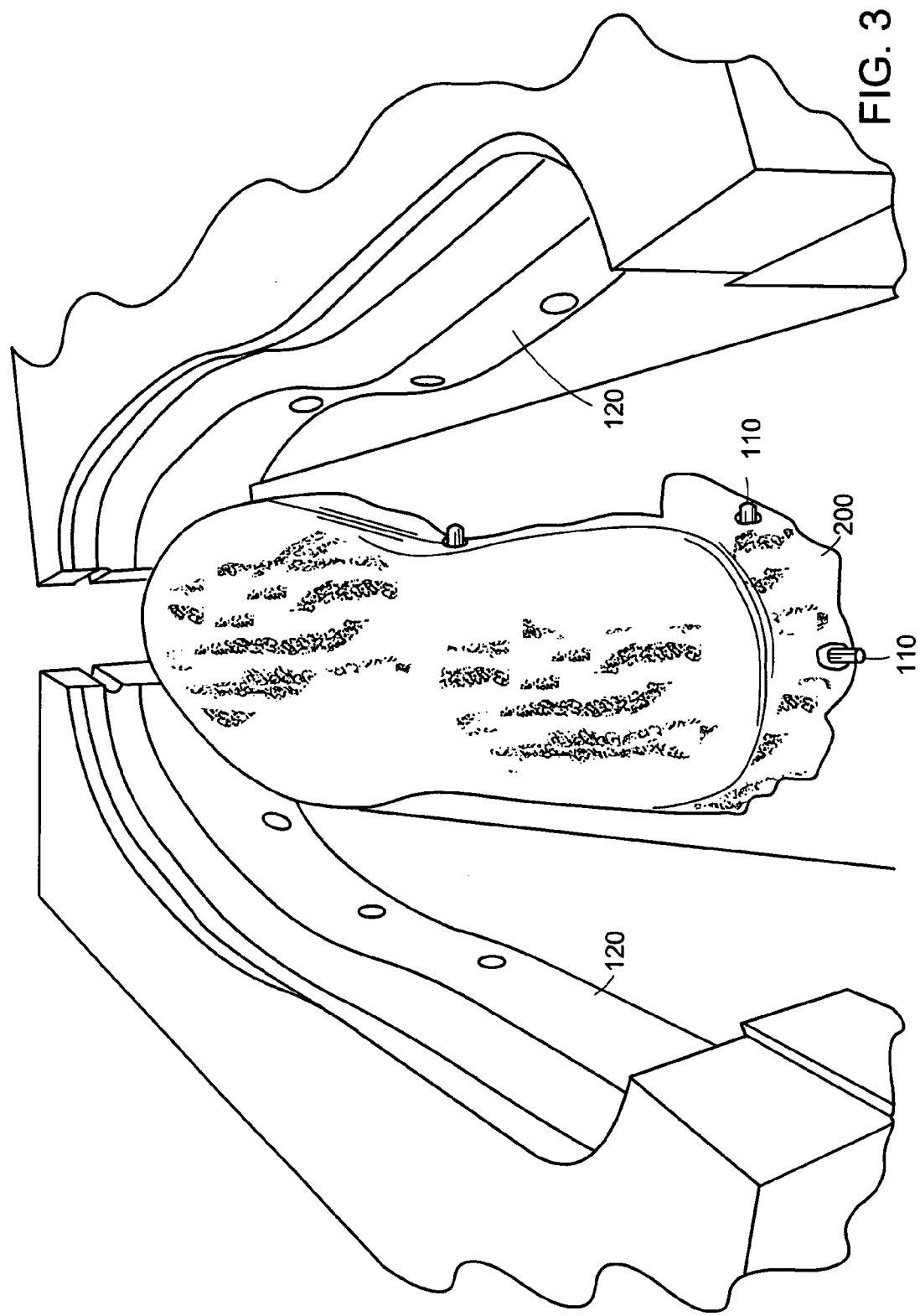
FIG. 3 depicts the sole plate with attached textile layer, textile fasteners, and mold side walls utilized in an example embodiment of the process and apparatus of the present invention.

FIG. 2 depicts the textile layer 200 being attached to the textile fasteners 110 on the sole plate 100. FIG. 3 depicts the sole plate with attached textile layer 200 and textile fasteners 110, between mold side walls 120 and ready for the injection molding process.

Figure 4:
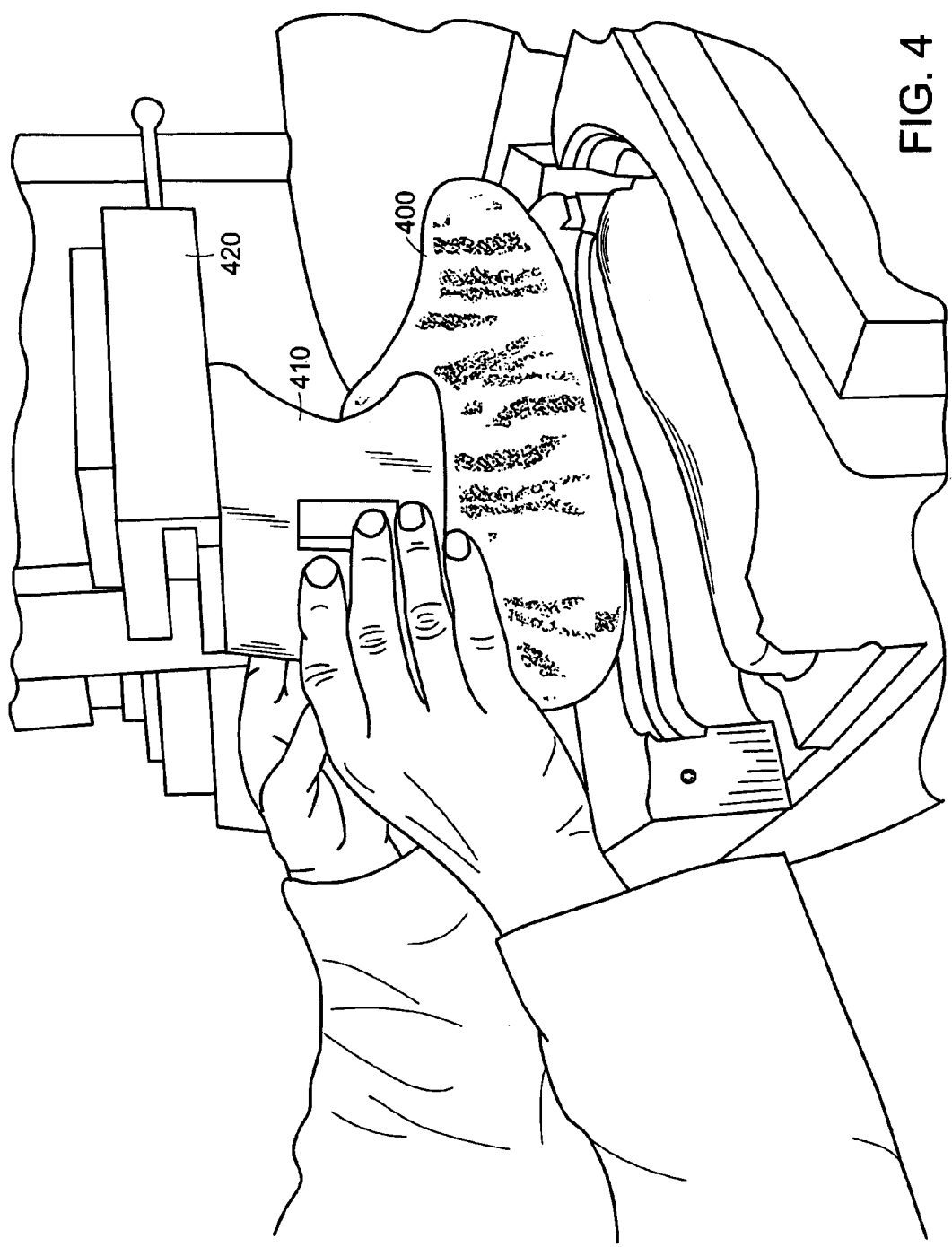
FIG. 4 depicts a shoe upper mounted on the shoe last being positioned over the sole plate with attached textile layer in an example embodiment of the process and apparatus of the present invention.

FIG. 4 depicts shoe upper 400, mounted on shoe last 410. Upper 400 and last 410 are being positioned by positioning apparatus 420 over the sole plate with the attached textile layer 200. Positioning apparatus 420 is used to position upper 400 and last 410 at the right height between mold side walls 120, leaving an interstitial space into which the moldable material will flow to create the molded outsole during injection. The mold side walls 120 are ready for closing and start of injection. Molding the upper directly to the outsole provides a superior bond, making the resulting article of footwear more durable. It also creates a more flexible footwear article, as no midsole is required that might hinder flex. While in a preferred embodiment the upper is a textile made of natural or man-made fibers, any other type of upper known in the art, including, but not limited to, leather, rubber, and plastic, is suitable for use in the present invention.

Figure 5:
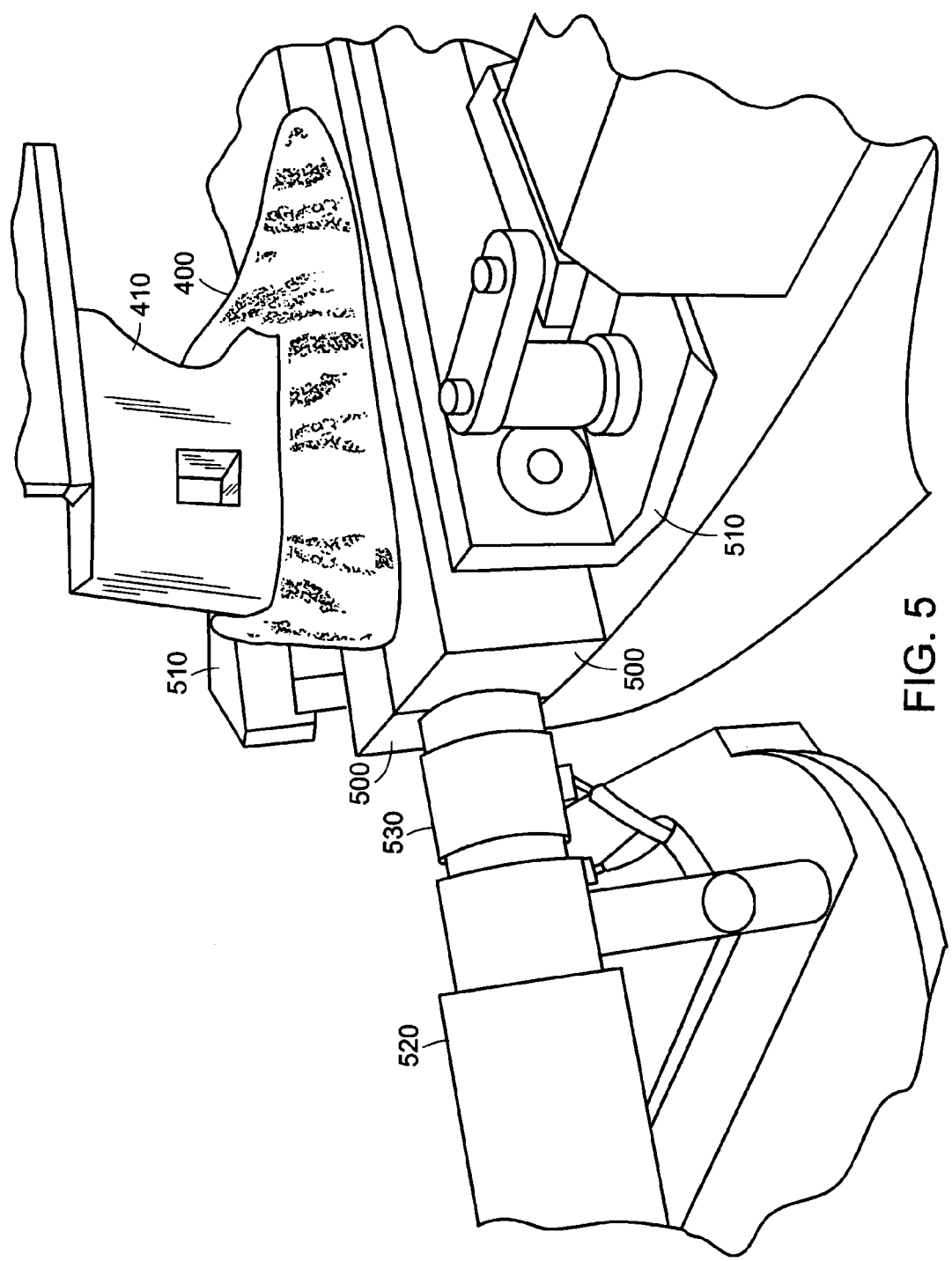
FIG. 5 depicts an example embodiment of the apparatus of the present invention, ready for the start of injection molding.

FIG. 5 depicts an example embodiment of the apparatus of the present invention, ready for injection molding. In FIG. 5, the mold 500 has been closed around the sole plate (not visible), upper 400, and shoe last 410. In the embodiment shown, closing apparatus 510 operates in a vise-like manner, holding the mold side walls closed to form mold 500 during injection. The moldable material is then injected from injection apparatus 520 through injection tube 530, which is attached to the injection channel formed in mold 500 when the mold side walls are closed.

Figure 6:
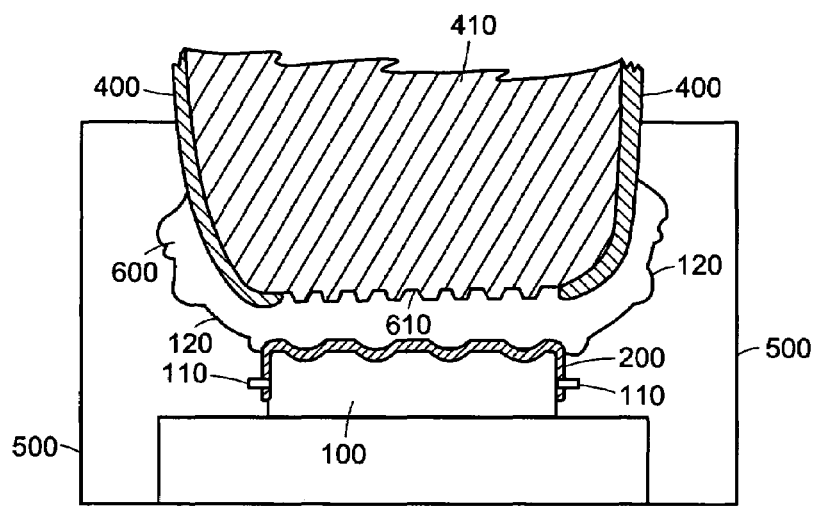
FIG. 6 depicts an enlarged cross section of an example embodiment of the apparatus of the present invention, ready for the start of injection molding.

FIG. 6 depicts an enlarged cross section of an example embodiment of the apparatus of the present invention, ready for the start of injection molding. Interstitial cavity 600 is formed by mold side walls 120, sole plate 100, and shoe last 410. The moldable material fills interstitial cavity 600 during injection, embedding textile layer 200 and upper 400 into the molded outsole produced thereby. In a preferred embodiment, interstitial cavity 600 extends around the side of upper 400, allowing the finished outsole to be moldably attached to the upper 400 across a wide band. This gives the finished outsole a foxing-like appearance and greatly increases the footwear durability because of the large area of attachment between the outsole and upper 400. Separation of the outsole and the upper are therefore extremely unlikely in this embodiment.

Shoe last 410 has optional grooves 610 on the bottom, allowing the molded outsole produced to have air pockets on its inner surface, providing increased flexibility of the molded sole. Any desired pattern for optional grooves 610 may be employed.

Figure 7:
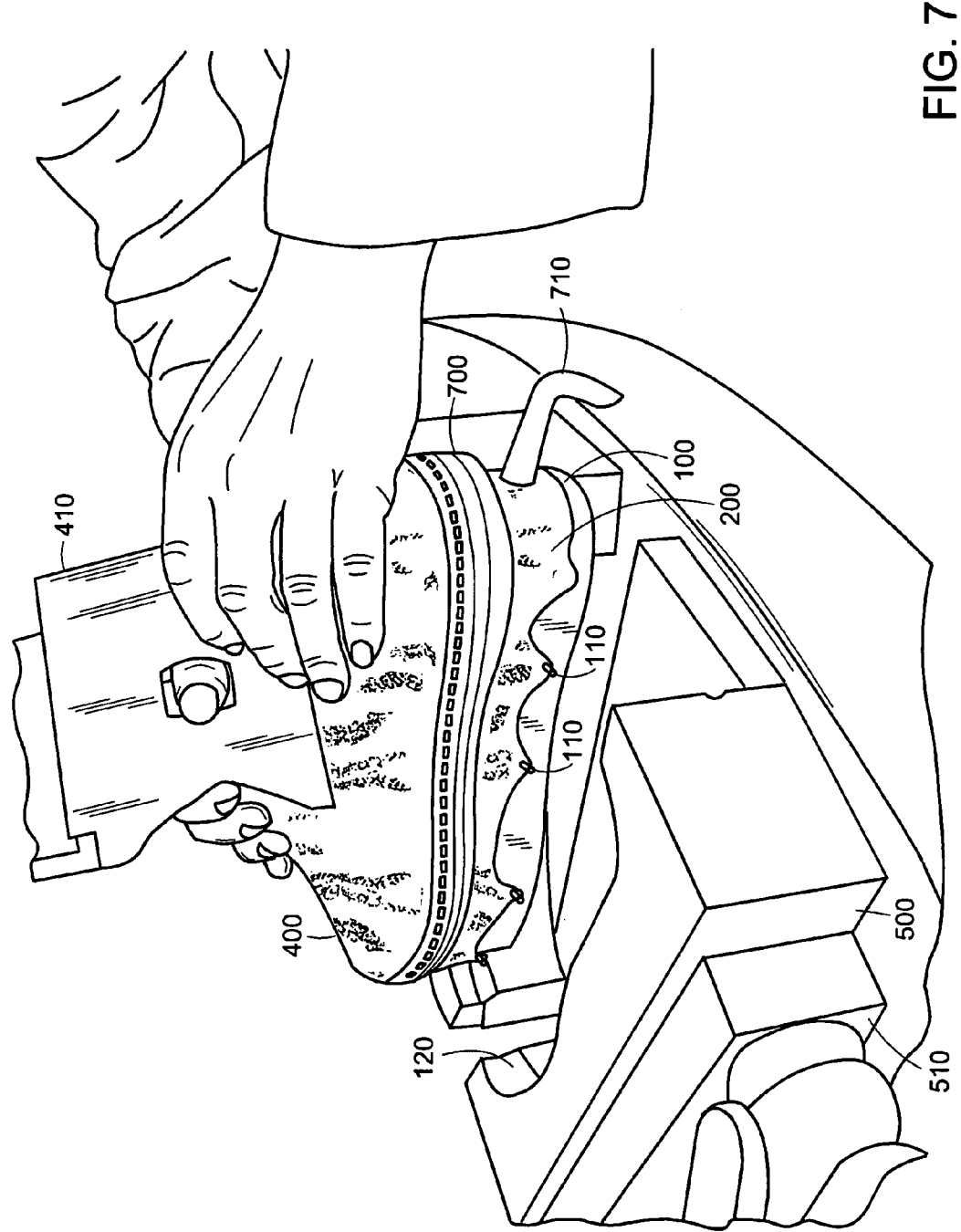
FIG. 7 depicts the removal of a completed article of footwear from the mold after injection molding in an example embodiment of the process and apparatus of the present invention.

FIG. 7 depicts the removal of a completed article of footwear from the mold after injection molding. The side walls 120 of mold 500 are opened, and sole plate 100 and the molded article of footwear are removed. At this point, textile layer 200 is detached from textile fasteners 110, and molded outsole layer 700 with integrally attached upper 400 and textile outsole layer 200 is removed from sole plate 100. Tube 710 protruding from the back of the shoe is moldable material that has hardened in the injection tube during injection. It is trimmed off.

Figure 8:
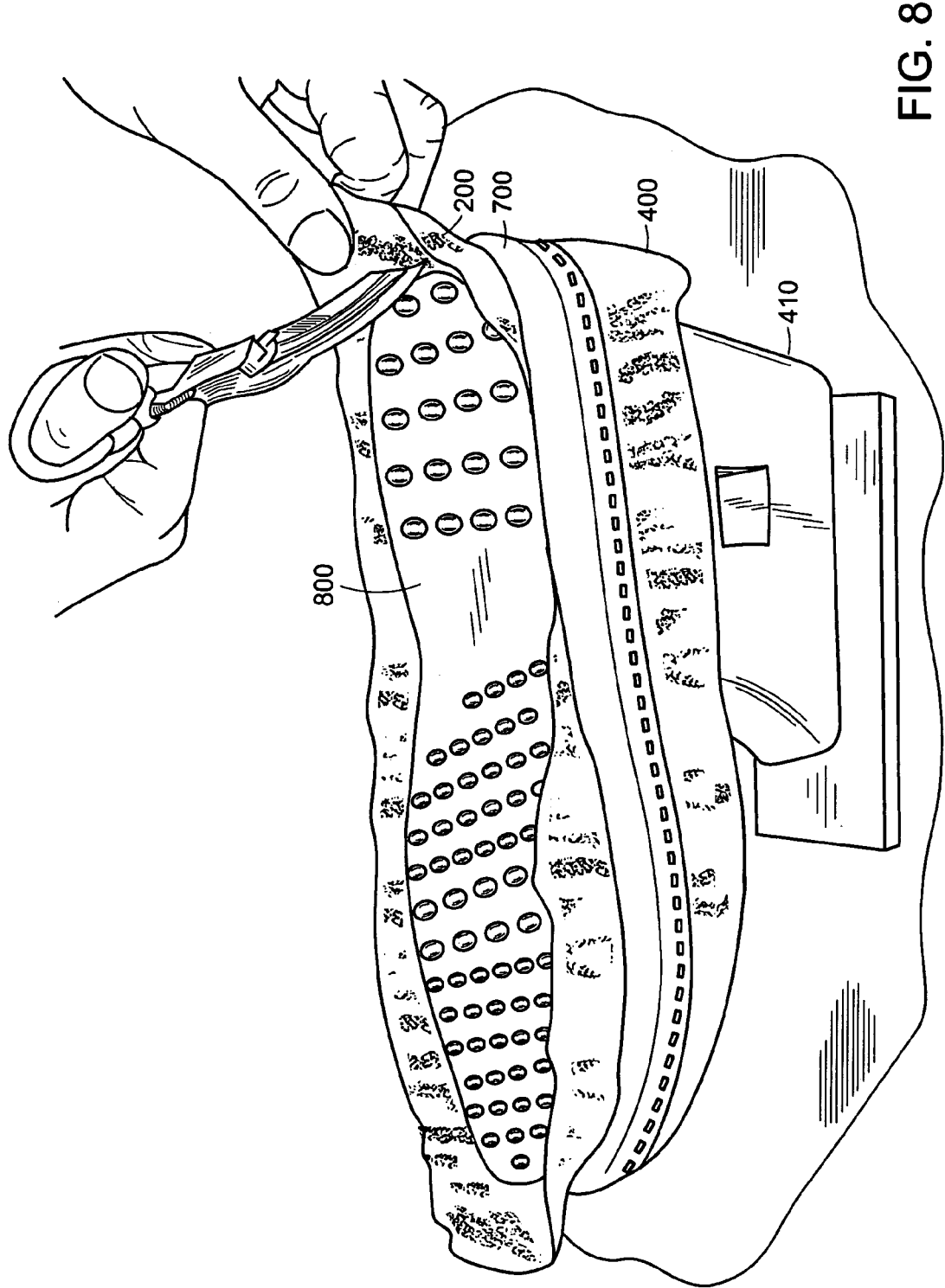
FIG. 8 depicts trimming of the excess textile layer from a completed article of footwear made by an example embodiment of the process and apparatus of the present invention.

FIG. 8 depicts trimming of the excess textile layer 200 from a completed article of footwear made by an example embodiment of the process and apparatus of the present invention. Excess textile layer 200 is trimmed as close as possible to molded outsole layer 700 with any suitable implement, leaving behind ground-contacting textile outsole layer 800 that is integrally molded to outsole layer 700. Integral formation of the textile-covered outsole provides one of the significant advantages of the present invention, which is prevention of tearing of the ground-contacting textile outsole layer and/or separation of the textile outsole layer 800 from the molded outsole layer 700.

Figure 9:
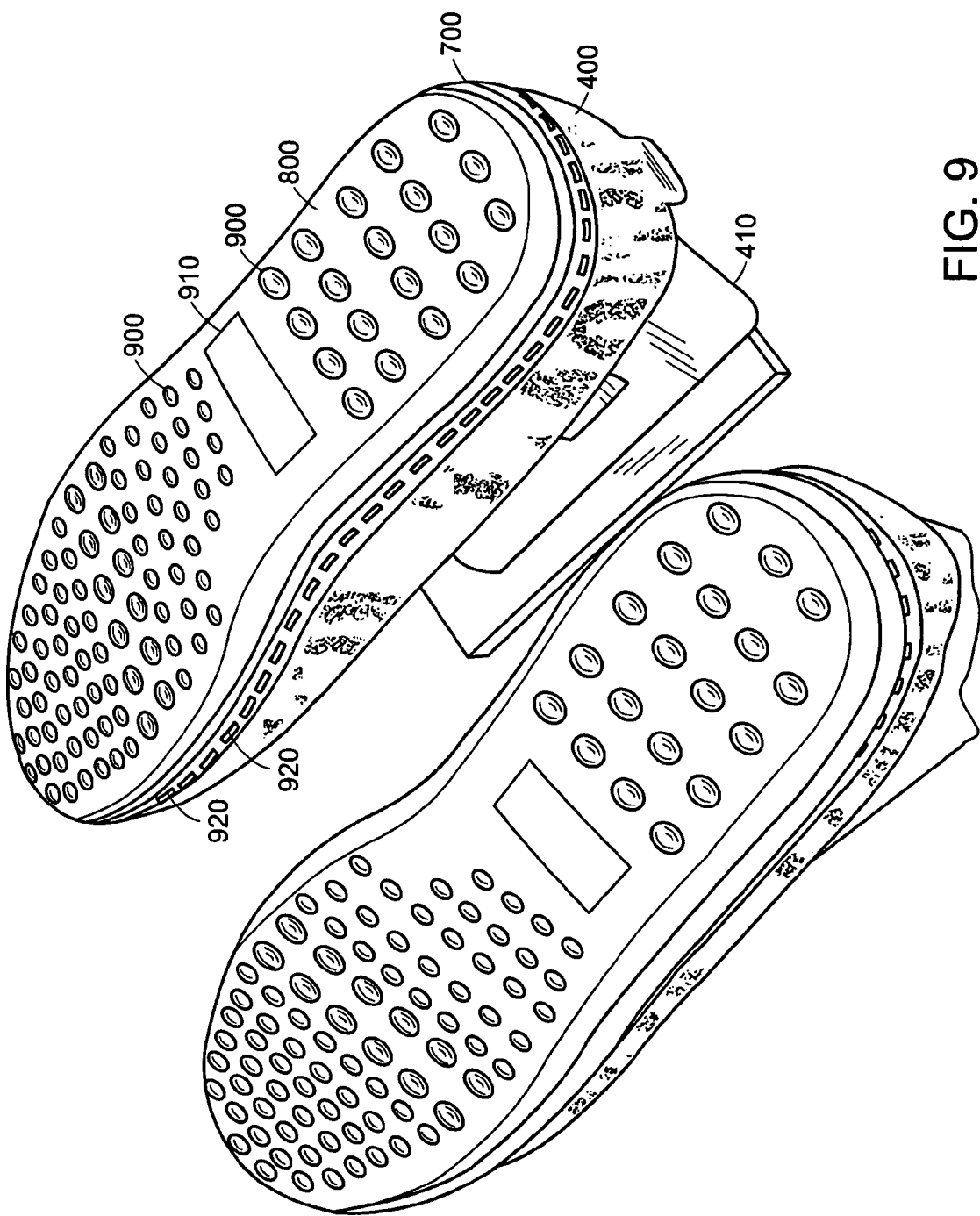
FIG. 9 is a bottom view of two articles of textile-soled footwear made by an embodiment of the process of the present invention, ready to remove from the shoe last.

FIG. 9 is a bottom view of two articles of textile-soled footwear made by an embodiment of the process of the present invention, trimmed and ready to remove from the shoe last 410. The removed footwear shell is then ready for whatever additional steps may be desired, including, but not limited to, cleaning and addition of such things as fasteners, linings, padding, inner sole, orthotics, labels, and trims.

In the preferred embodiment of the invention, the molded outsole layer 700 has treads 900 in the form of bumps, ridges, or other types of protrusions to which textile outsole layer 800 is moldably attached. These treads can be laid out in any desired pattern and provide improved slip resistance. With use, ground-contacting textile outsole layer 800 may wear away from the ground-contacting surfaces of treads 900, which will generally increase slip resistance. An important feature of the present invention is that, because ground-contacting textile outsole layer 800 and molded outsole 700 are integrally molded together, this wearing away does not cause tears in ground-contacting textile outsole layer 800 or separation of textile outsole layer 800 from molded outsole layer 700. It will be appreciated that any type of pattern, design, label, or similar device, such as label 910 and decorative seam detail 920 shown in the embodiment of FIG. 9, may be present on any desired surface of the molded outsole.

Figure 10:
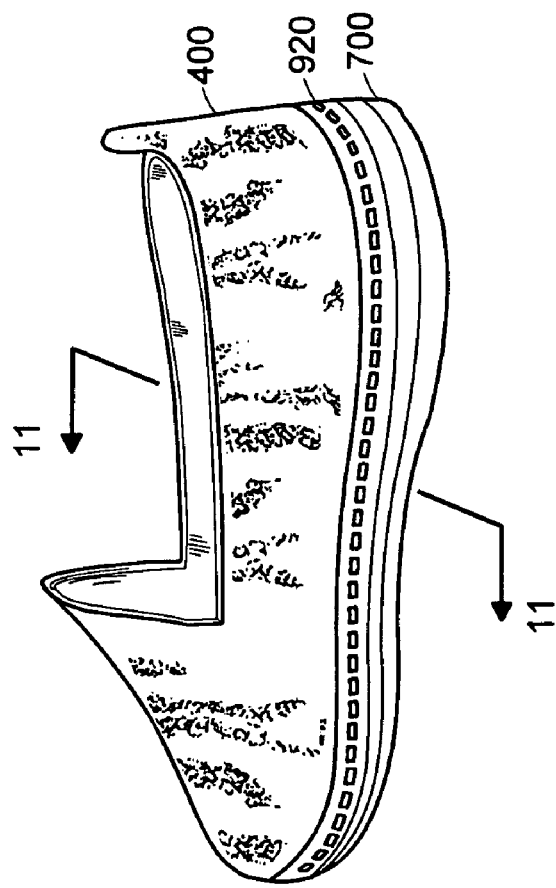
FIG. 10 is a side view of an article of textile-soled footwear made by an embodiment of the process of the present invention.

FIG. 10 is a side view of an article of textile-soled footwear made by an embodiment of the process of the present invention, showing upper 400 moldably attached to molded outsole layer 700, with optional decorative seam detail 920.

Figure 11:
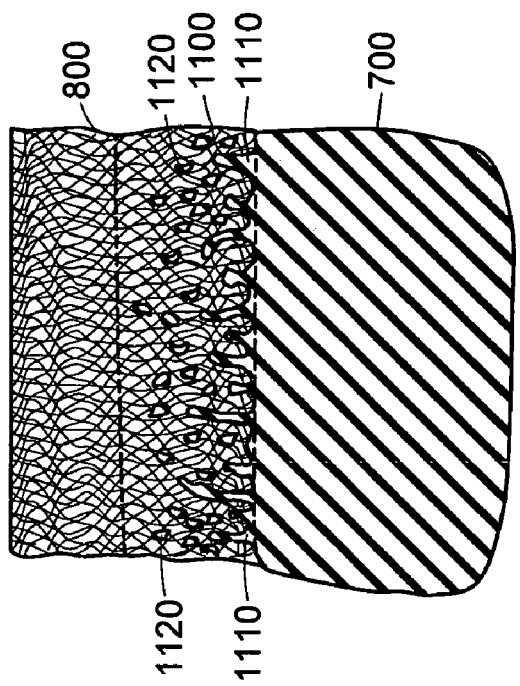
FIG. 11 is a magnified cross section of a piece of the outsole of an article of textile-soled footwear made by an embodiment of the process of the present invention.

FIG. 11 is a magnified cross section of a piece of the outsole of an article of textile-soled footwear made by an embodiment of the process of the present invention. Ground-contacting textile outsole layer 800 is integrally embedded in molded outsole layer 700 at fusion zone 1100, an area of textile outsole layer 800 which has been impregnated with "fingers" 110 and droplets 1120 of the moldable material making up molded outsole layer 700. Fusion zone 1100 is therefore the operable source of the moldable attachment of textile outsole layer 800 to molded outsole layer 700.

Figure 12:
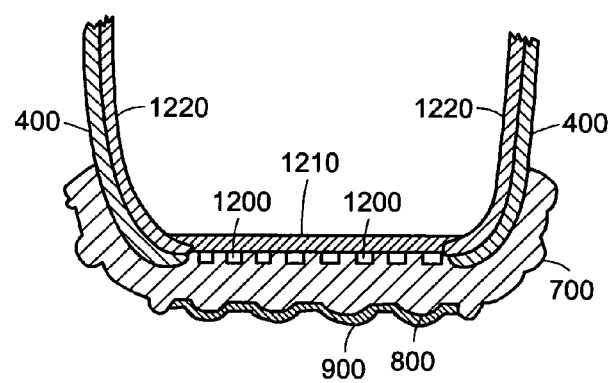
FIG. 12 is an enlarged cross section of an article of textile-soled footwear made by an embodiment of the process of the present invention.

FIG. 12 is a cross section of an article of textile-soled footwear made by an embodiment of the process of the present invention. As shown in FIG. 12, upper 400 is embedded in molded outsole layer 700, as is ground-contacting textile outsole layer 800. Optional treads 900 are also shown, to which textile outsole layer 200 is moldably conformed.

The molded outsole layer 700 has optional air pockets 1200 on its inner surface, providing for increased flexibility of the molded sole. An optional inner sole 1210 of any of the many constructions known in the art may be provided, as may any of the many types of padding, support devices, and/or orthotics known in the art. Similarly, an optional inner lining 1220 may be added, with or without added padding or support devices.

The molded textile-layered sole of the footwear of the present invention is an "indoor-outdoor" sole, having a textile ground-contacting surface that is rigid enough to walk on outdoor-type surfaces such as driveways, decking, cement floors, and gravel. The moldable attachment of the upper and the ground-contacting textile layer to the outsole provide a far more durable article of footwear than those having ground-contacting textile layers and/or uppers attached by other methods, such as stitching or adhesives.

The apparatus and method of the present invention, therefore, provide an article of footwear having a textile layer at the ground-contacting surface of the outsole. This article of textile-soled footwear is more durable than footwear having non-moldably attached uppers, is durable when worn on outside-type surfaces, is slip-resistant, has a flexible but shape-retaining outsole, and is durable despite repeated flexing. The invention further provides a simple process and apparatus for the fabrication of textile-soled footwear that allows fabrication of the entire outer, shell of the footwear via a single injection-molding step. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications and substitutions by one of ordinary skill in the art are therefore also considered to be within the scope of the present invention, which is not to be limited except by the claims that follow.

What is claimed is:

1. A method for fabrication of textile-soled footwear comprising, in combination, the steps of:
    fastening a textile layer across a sole plate, the sole plate having a top, bottom, and sides, by stretching the textile layer tightly across the bottom of the sole plate and fastening it firmly with fasteners disposed along the sides of the sole plate;
    assembling the sole plate with attached textile layer in place between the side wails of an injection mold;
    placing a last holding an upper in place above the top of the sole plate such that space remains between the bottom of the last and the top of the sole plate, said space for receiving moldable material to form an outsole;
    assembling the mold in preparation for injection molding; and
    injecting moldable material into the mold to form an outsole that is moldably attached to the upper and the textile layer.

2. The method of claim 1, further including the step of trimming excess textile layer from the footwear after molding is complete.

3. An apparatus for fabrication of textile-soled footwear comprising, in combination:
    an injection mold for receiving moldable material to form an outsole;
    a sole plate, said sole plate being fastenable inside the injection mold, said sole plate having a top, bottom, and sides;
    a plurality of fasteners for securing a textile layer across the bottom of the sole plate, said fasteners being attached to the sole plate along the sides of the sole plate;
    a shoe last, said shoe last being positionable within the injection mold so that space remains above the top of the sole plate and an upper attached to the last will extend within the space.

4. The apparatus of claim 3, further comprising an injection molding apparatus.

5. The apparatus of claim 3, wherein the sole plate has a plurality of depressions for forming treads on an outsole molded upon it.

6. The apparatus of claim 3, wherein the number of fasteners is at least eight.

* * * * *